(12) United States Patent
Yamada et al.

(10) Patent No.: US 9,929,670 B2
(45) Date of Patent: Mar. 27, 2018

(54) POWER CONVERSION DEVICE, MOTOR DRIVE CONTROL DEVICE EQUIPPED WITH POWER CONVERSION DEVICE, COMPRESSOR AND BLOWER EQUIPPED WITH MOTOR DRIVE CONTROL DEVICE, AND AIR CONDITIONER EQUIPPED WITH COMPRESSOR OR BLOWER (71) Applicant: Mitsubishi Electric Corporation, Tokyo (JP)

(72) Inventors: Michio Yamada, Tokyo (JP); Takuya Shimomugi, Tokyo (JP); Yosuke Shinomoto, Tokyo (JP); Mitsuo Kashima, Tokyo (JP); Shigeo Umehara, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 14/891,741

(22) PCT Filed: May 26, 2014

(86) PCT No.: PCT/JP2014/063843
§ 371 (c)(1),
(2) Date: Nov. 17, 2015

(87) PCT Pub. No.: WO2014/192696
PCT Pub. Date: Dec. 4, 2014

(65) Prior Publication Data
US 2016/0087547 A1 Mar. 24, 2016

(30) Foreign Application Priority Data
May 28, 2013 (WO) .................. PCT/JP2013/064804

(51) Int. Cl.
*H02M 1/12* (2006.01)
*H02M 7/06* (2006.01)
(Continued)

(52) U.S. Cl.
CPC ............... *H02M 7/06* (2013.01); *H02M 1/12* (2013.01); *H02M 1/4225* (2013.01);
(Continued)

(58) Field of Classification Search
CPC ........ H02M 7/06; H02P 27/00; H02P 23/0081
See application file for complete search history.

(56) References Cited

U.S. PATENT DOCUMENTS 4,151,387 A * 4/1979 Peters, Jr. ................. F24C 7/02
219/623
5,430,639 A * 7/1995 Takahashi ........... H02M 1/4216
363/124
(Continued)

FOREIGN PATENT DOCUMENTS

CN 203691263 U 7/2014
JP H05-164058 A 6/1993
(Continued)

OTHER PUBLICATIONS

International Search Report of the International Searching Authority dated Jul. 15, 2014 for the corresponding international application No. PCT/JP2014/063843 (and English translation).
(Continued)

*Primary Examiner* — Shawki S Ismail
*Assistant Examiner* — Muhammad S Islam
(74) *Attorney, Agent, or Firm* — Posz Law Group, PLC (57) ABSTRACT A power conversion device is configured to have reactors and is configured to have chopper circuit units, connected in series, that chop the output of a rectifier configured to rectify an AC voltage from an AC power supply. The power
(Continued)

conversion device includes: an AC switch disposed on a side closer to the AC power supply than the chopper circuit units; an AC reactor that is connected in parallel to the AC switch; and a switching control unit that stops the switching of the switching elements when the contact of the AC switch is open.

19 Claims, 7 Drawing Sheets

(51) Int. Cl.
| | | |
|---|---|---|
| *H02M 1/42* | (2007.01) | |
| *H02M 3/158* | (2006.01) | |
| *H02P 27/00* | (2006.01) | |
| *F24F 11/00* | (2018.01) | |
| *H02M 1/00* | (2006.01) | |
| *H02M 5/458* | (2006.01) | |
| *H02M 7/08* | (2006.01) | |
| *H02M 7/5387* | (2007.01) | |

(52) U.S. Cl.
CPC .......... *H02M 3/1584* (2013.01); *H02P 27/00* (2013.01); *F24F 2011/0083* (2013.01); *H02M 5/458* (2013.01); *H02M 7/08* (2013.01); *H02M 7/53871* (2013.01); *H02M 2001/0048* (2013.01); *H02M 2003/1586* (2013.01); *Y02B 70/126* (2013.01); *Y02B 70/1491* (2013.01)

(56) References Cited

U.S. PATENT DOCUMENTS

| | | | |
|---|---|---|---|
| 2006/0145674 A1* | 7/2006 | Shelton | H02M 1/4225 323/282 |
| 2010/0044160 A1* | 2/2010 | Agirman | B66B 5/027 187/290 |
| 2011/0132899 A1* | 6/2011 | Shimomugi | H02M 3/1584 219/620 |

FOREIGN PATENT DOCUMENTS

| | | | |
|---|---|---|---|
| JP | 06-269161 A | | 9/1994 |
| JP | H11-289766 A | | 10/1999 |
| JP | 2000-262047 A | | 9/2000 |
| JP | 2005-261040 A | | 9/2005 |
| JP | 2009-060705 A | | 3/2009 |
| JP | 2010-187521 A | | 8/2010 |
| JP | 2011-045218 A | | 3/2011 |
| JP | 2011-172485 A | | 9/2011 |
| JP | 2012-016164 A | | 1/2012 |
| JP | 2012-065494 A | | 3/2012 |
| JP | 2012-165539 A | | 8/2012 |
| JP | 2012165539 | * | 8/2012 |
| JP | 2012-187521 A | | 10/2012 |
| JP | 2013-059228 A | | 3/2013 |
| WO | 2013/035534 A1 | | 3/2013 |

OTHER PUBLICATIONS

Office Action dated Apr. 1, 2017 issued in corresponding CN application No. 2014800296812 (and partial English translation).

* cited by examiner

POWER CONVERSION DEVICE, MOTOR DRIVE CONTROL DEVICE EQUIPPED WITH POWER CONVERSION DEVICE, COMPRESSOR AND BLOWER EQUIPPED WITH MOTOR DRIVE CONTROL DEVICE, AND AIR CONDITIONER EQUIPPED WITH COMPRESSOR OR BLOWER

CROSS REFERENCE TO RELATED APPLICATIONS

This application is a U.S. national stage application of International Patent Application No. PCT/JP2014/063843 filed on May 26, 2014, which claims priority to International Patent Application No. PCT/JP2013/064804 filed on May 28, 2013, the disclosures of which are incorporated herein by reference.

TECHNICAL FIELD

The present invention relates to a power conversion device, a motor drive control device equipped with the power conversion device, a compressor and a blower equipped with the motor drive control device, and an air conditioner equipped with the compressor or the blower.

BACKGROUND

Conventionally, to suppress damage due to harmonic components included in the power supply current, internationally regulations are provided on the electronic devices which generate a harmonic current. To clear this regulation, there are policies which perform the power short-circuit by performing the chopping of AC or DC using a converter, and suppress the harmonic current included in the power supply current.

In a converter which performs the chopping of DC, there is an interleave type converter in which a plurality of chopper circuits is connected in parallel and is switched at each of the different switching phases to cancel the ripple caused by the switching in the input current as the sum of the current flowing in each chopper circuit unit, thereby suppressing the harmonic current. In this type, a technique for achieving a loss reduction by bypassing a chopper circuit with a relay is disclosed (for example, see Patent Literatures 1 and 2).

PATENT LITERATURE

Patent Literature 1: Japanese Patent Application Laid-Open No. 2011-45218
Patent Literature 2: Japanese Patent Application Laid-Open No. 2009-60705

However, according to the prior art (Patent Literature 1), when bypassing the chopper circuit unit, a reactor connected between a power supply and a smoothing capacitor is also bypassed. Therefore, there is a problem of difficulty in obtaining the effect of suppressing the harmonic current. Also, according to the prior art (Patent Literature 2), in general, there is a need to use two expensive DC switches as compared to an AC switch. Therefore, there is a problem of requiring high cost as compared to the case of using the AC switch.

SUMMARY

The present invention has been made in view of the circumstances, and an object thereof is to provide a power conversion device with low loss, while suppressing the harmonic current with a simple configuration, a motor drive control device equipped with the power conversion device, a compressor and a blower equipped with the motor drive control device, and an air conditioner equipped with the compressor or the blower.

In order to solve the problems and achieve the object, according to an aspect of the present invention, there is provided a power conversion device that is configured to have a switching element and is equipped with a chopper circuit unit that chops the output of a rectifier configured to rectify an AC voltage from an AC power supply, the power conversion device including: a switch disposed on a side closer to the AC power supply than the chopper circuit unit; a reactor that is disposed on a side closer to the AC power supply than the chopper circuit unit, and is connected in parallel to the switch; and a control unit that stops the switching of the switching element when the contact of the switch is open.

The power conversion device, the motor drive control device equipped with the power conversion device, the compressor and the blower equipped with the motor drive control device, and the air conditioner equipped with the compressor or the blower according to the present invention have an effect of being able to achieve a low loss, while suppressing the harmonic current with a simple configuration.

DETAILED DESCRIPTION

Exemplary embodiments of a power conversion device, a motor drive control device equipped with the power conversion device, a compressor and a blower equipped with the motor drive control device, and an air conditioner equipped with the compressor or the blower according to the present invention will be described in detail below with reference to the drawings. The present invention is not limited to the embodiments.

First Embodiment

Figure 1:
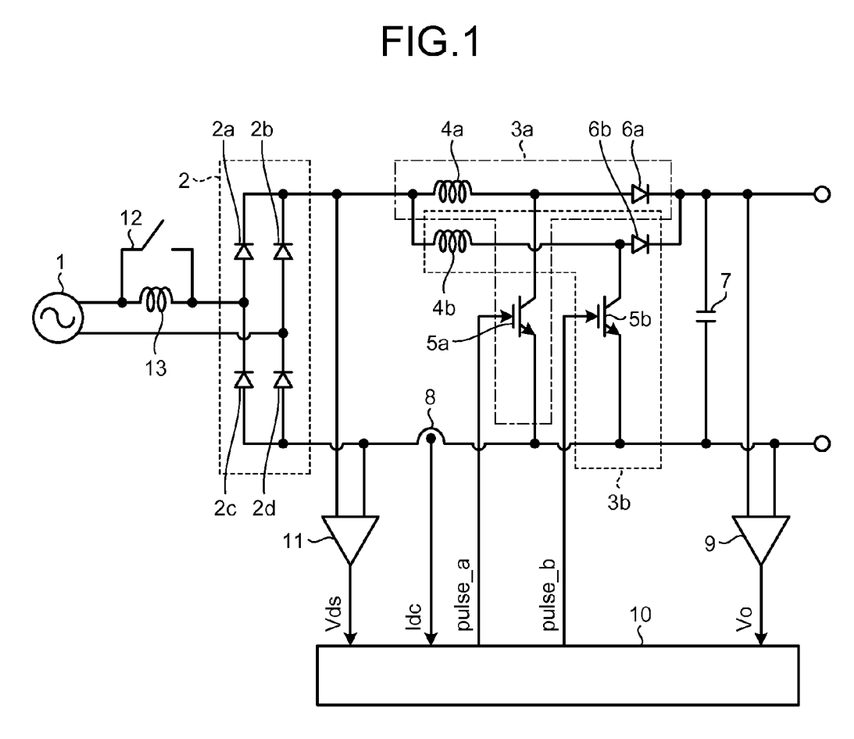
FIG. 1 is a diagram illustrating a configuration example of the power conversion device according to a first embodiment.

FIG. 1 is a diagram illustrating a configuration example of a power conversion device according to this embodiment. As illustrated in FIG. 1, the power conversion device is equipped with a single-phase rectifier 2, chopper circuit units 3a and 3b, a smoothing capacitor 7, a bus current detector 8, a bus voltage detector 9, a switching controller 10, a rectified voltage detector 11, an AC switch 12 and an AC reactor 13.

The single-phase rectifier (hereinafter, simply referred to as a "rectifier") 2 is configured by a bridge connection of four rectifier diodes 2a to 2d to rectify the AC voltage of the single-phase AC power supply (hereinafter, simply referred to as an "AC power supply") 1. The chopper circuit unit 3a is configured to include a reactor 4a, a switching element 5a and a backflow prevention element 6a. The chopper circuit unit 3b is configured to include a reactor 4b, a switching element 5b and a backflow prevention element 6b. As illustrated in FIG. 1, the chopper circuit unit 3a and the chopper circuit unit 3b are connected in parallel to each other. Each of the switching elements 5a and 5b, for example, has an insulated gate bipolar transistor (IGBT). Furthermore, each of the backflow prevention elements 6a and 6b, for example, has a fast recovery diode. The smoothing capacitor 7 smoothes the output of the chopper circuit units 3a and 3b.

The bus current detector 8 detects a bus current (Idc) which is a current flowing from the rectifier 2 to a load (not illustrated) and flowing from the load to the rectifier 2, and outputs the detected bus current to the switching controller 10. The bus voltage detector 9 detects a bus voltage (Vo) as voltage obtained by smoothing the output voltage of the chopper circuit units 3a and 3b through a smoothing capacitor 7, and outputs the detected bus voltage to the switching controller 10. The switching controller 10 is a control unit which generates a drive pulse which operates the switching elements 5a and 5b, based on the output signals of the bus current detector 8 and the bus voltage detector 9. The rectified voltage detector 11 detects the rectified voltage (Vds) rectified by the rectifier 2, and outputs the rectified voltage to the switching controller 10.

The AC switch 12 is a switch which switches whether to allow the power supply current from the AC power supply 1 to pass through the AC reactor 13 or to bypass the AC reactor 13. The AC reactor 13 is a reactor which suppresses the harmonic current from the AC power supply 1. As illustrated in FIG. 1, the AC switch 12 and the AC reactor 13 are disposed between the AC power supply 1 and the rectifier 2, and are connected in parallel to each other.

Although FIG. 1 illustrates a configuration example in which the AC power supply 1 is a single-phase AC power supply and the rectifier 2 is a single-phase rectifier, this is an example, and a configuration in which the AC power supply 1 is a three-phase AC power supply and the rectifier 2 is a three-phase rectifier may be provided. Also, in the example illustrated in FIG. 1, although a configuration example in which the two chopper circuit units are connected in parallel to each other is illustrated, this is an example, and a configuration in which three or more chopper circuits are connected in parallel to one another may be provided.

Further, the chopper circuit unit is not limited to a configuration in which the plurality of chopper circuits is connected in parallel to each other, and a configuration of only one single chopper circuit may be provided. Similarly, in the following embodiments, the chopper circuit unit may be one or more.

Figure 2:
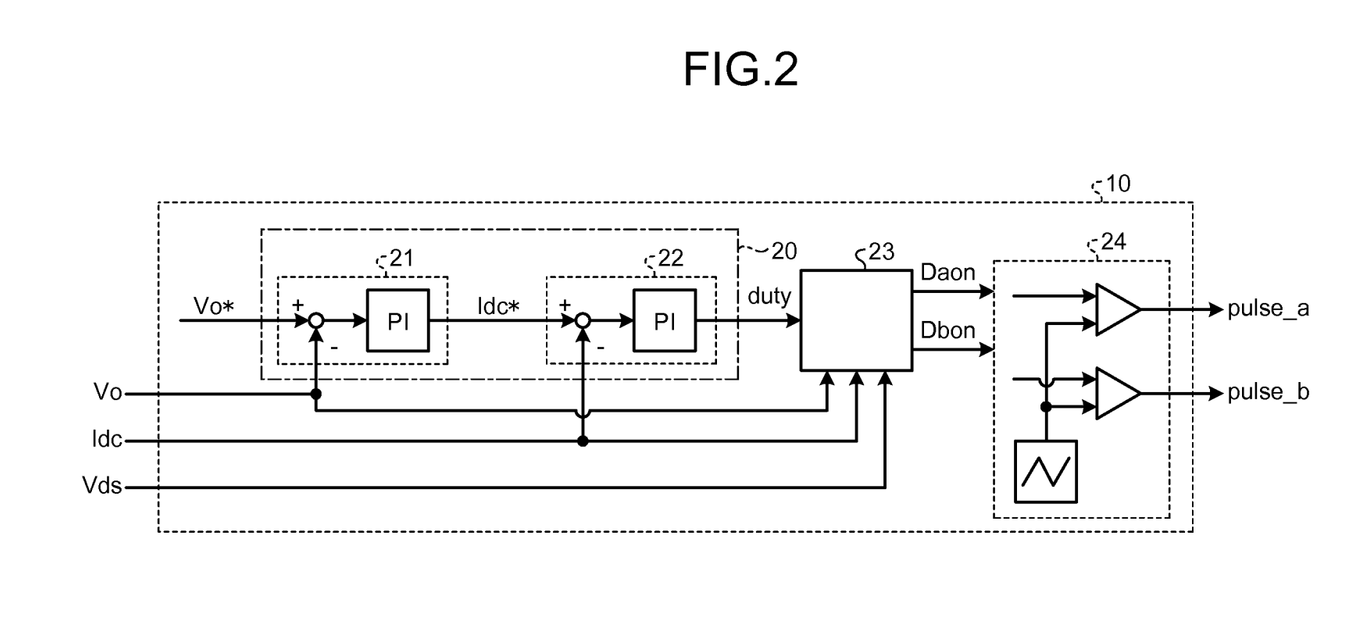
FIG. 2 is a diagram illustrating a configuration example of a switching controller of the power conversion device according to the first embodiment.

FIG. 2 is a diagram illustrating a configuration example of the switching controller of the power conversion device according to this embodiment. As illustrated in FIG. 2, the switching controller 10 is provided with an on-duty calculator 20 equipped with a bus current command value controller 21 and an on-duty controller 22, an on-duty corrector 23 and a drive pulse generator 24. The switching controller 10 is configured, for example, by using an arithmetic unit such as a microcomputer.

The bus current command value controller 21 calculates a bus current command value (Idc*) from a bus voltage (Vo) as the output signal of the bus voltage detector 9 and, for example, a preset bus voltage command value (Vo*). The bus current command value (Idc*) is calculated, for example, by performing a proportion integral control of a difference between the bus voltage (Vo) as the output signal of the bus voltage detector 9 and the bus voltage command value (Vo*).

The on-duty controller 22 calculates a reference on-duty (duty) for each of the switching elements 5a and 5b, from the bus current command value (Idc*) calculated by the bus current command value controller 21 and from the bus current (Idc) detected by the bus current detector 8. The reference on-duty (duty), for example, is calculated by performing a proportion integral control of a difference between the bus current command value (Idc*) as the output of the bus current command value controller 21 and the bus current (Idc) as the output signal of the bus current detector 8.

The on-duty corrector 23 corrects a reference on-duty (duty) of each of the switching elements 5a and 5b calculated by the on-duty controller 22 to generate the on-duty (Daon) of the switching element 5a and the on-duty (Dbon) of the switching element 5b.

The drive pulse generator 24 generates and outputs the drive pulses (pulse_a, pulse_b) which operate the switching elements 5a and 5b, based on the respective on-duties (Daon, Dbon) generated by the on-duty corrector 23.

Here, as control parameters used in the calculation in the bus current command value controller 21 and the on-duty controller 22, optimal values according to the operating situations of the circuit are present, for example, a proportional control gain in the on-duty controller 22 varies in inverse proportion to the bus voltage. Therefore, formulas or tables depending on the values of the rectified voltage as an output voltage of the rectifier 2, the bus current (Idc) and the bus voltage (Vo) are provided, and the control parameters may be adjusted depending on the operating situations of the circuit. Thus, it is possible to improve the controllability in the switching controller 10.

Also, although the proportional integral control is adapted as an operation method of the bus current command value controller 21 and the on-duty controller 22, the calculation method is not limited to this control calculation method, and other calculation methods, such as performing the proportional integral and differential control by adding a differential term, may be used. Also, as the calculation method of the bus current command value controller 21 and the on-duty controller 22, different methods may be used, without the necessity for the same method.

Here, the operation of the on-duty corrector 23 will be described in conjunction with the operation of each of the chopper circuit units 3a and 3b. Here, first, the behavior when the switching element 5a of the chopper circuit unit 3a is turned on/off will be described. The rectified voltage (Vds) as the output of the rectifier 2 is input to the chopper circuit unit 3a, and the output of the chopper circuit unit 3a is smoothed by the smoothing capacitor 7 to obtain the bus voltage (Vo). In the chopper circuit unit 3a, when the switching element 5a is turned on, electric conduction of the backflow prevention element 6a is prevented, and the rectified voltage (Vds) is applied to the reactor 4a. Meanwhile, when the switching element 5a is turned off, the backflow prevention element 6a enters in the electric conduction state, and a voltage difference between the rectified voltage (Vds) and the bus voltage (Vo) is induced to the reactor 4a, in an opposite direction to that in the time when the switching element 5a is turned on. At this time, it can be seen that energy accumulated in the reactor 4a when turning-on the switching element 5a is transferred to the load when turning off the switching element 5. When the energy entering or exiting the reactor 4a is identical during turn-on/off of the switching element 5a, a relation among the on-duty (Daon), the rectified voltage (Vds) and the bus voltage (Vo) of the switching element 5a is expressed by the following formula (1).

$$Vo=Vds/(1-Daon) \qquad (1)$$

As is clear from the formula (1), it is possible to control the output voltage of the chopper circuit unit 3a, that is, the bus voltage (Vo), by controlling the on-duty (Daon) of the switching element 5a.

Next, a relation between a reactor current (ILaon) flowing through the reactor 4a in the chopper circuit unit 3a and the on-duty (Daon) will be described. When the switching element 5a is turned on, as described above, the rectified voltage (Vds) is applied to the reactor 4a. At this time, the reactor current (ILa) flowing in the reactor 4a from the AC power supply 1 side to the load side linearly increases. When the reactor current flowing through the reactor 4a at this time is set to ILaon and the inductance value of the reactor 4a is set to La, a slope ΔILaon of ILaon is expressed by the following formula (2).

$$\Delta ILaon=Vds/La \qquad (2)$$

Further, when the switching element 5a is turned off, that is, during a period when the drive pulse (pulse_a) is "L", as described above, the voltage difference between the rectified voltage (Vds) and the bus voltage (Vo) is applied to the reactor 4a in an opposite direction to that in the time when the switching element 5a is turned on, and the reactor current (ILa) flowing in the reactor 4a from the AC power supply 1 side to the load side linearly decreases. When the reactor current flowing through the reactor 4a at this time is set to ILaoff, a slope ΔILaoff of ILaoff is expressed by the following formula (3).

$$\Delta ILaoff=(Vds-Vo)/La \qquad (3)$$

Similarly, a relation among the on-duty (Dbon), the rectified voltage (Vds) and the bus voltage (Vo) of the switching element 5b is expressed by the following formula (4).

$$Vo=Vds/(1-Dbon) \qquad (4)$$

Further, when the switching element 5b is turned on, the reactor current (ILb) flowing in the reactor 4b from the AC power supply 1 side to the load side linearly increases. When the reactor current flowing through the reactor 4b at this time is set to ILbon and the inductance value of the reactor 4b is set to Lb, a slope ΔILbon of ILbon is expressed by the following formula (5).

$$\Delta ILbon=Vds/Lb \qquad (5)$$

Further, when the switching element 5b is turned off, the reactor current (ILb) flowing in the reactor 4b from the AC power supply 1 side to the load side linearly decreases. When the reactor current at this time is set to ILboff, a slope ΔILboff of ILboff is expressed by the following formula (6).

$$\Delta ILboff=(Vds-Vo)/Lb \qquad (6)$$

As described above, the respective on-duties (Daon, Dbon) of the switching elements 5a and 5b can be calculated using the bus voltage (Vo), the rectified voltage (Vds), the reactor current (ILa) and the reactor current (ILb) in the switching controller 10. Here, in a section in which the respective on-periods of the switching elements 5a and 5b do not overlap each other, the bus current (Idc) detected by the bus current detector 8 becomes a value equal to (ILaon+ILboff) or (ILaoff+ILbon). That is, the respective on-duties (Daon, Dbon) of the switching elements 5a and 5b can be calculated, using the bus current (Idc) detected by the bus current detector 8.

In this embodiment, for example, in the example illustrated in FIG. 1, the switching controller 10 performs a control so that the phase of the on-timing of the switching element 5b is delayed by a half cycle (180 (=360/2)°) with respect to the on-timing of the switching element 5a, in the switching periods of each of the switching elements 5a and 5b. Thus, the ripple of the bus current (Idc) as an added current of the reactor current (ILa) and the reactor current (ILb) caused by the switching of the switching elements 5a and 5b is offset. For example, when forming the power conversion device according to this embodiment by connecting n-chopper circuit units in parallel to one another, if a phase difference of the switching of the switching elements of each chopper circuit unit is set to (360/n)°, it is possible to minimize the ripple of the bus current (Idc). The phase difference of the switching of the switching elements in the plurality of chopper circuit units is an example, and the phase difference of the switching of each switching element in the plurality of chopper circuit units may be determined using other methods, without being limited to such a method.

Figure 3:
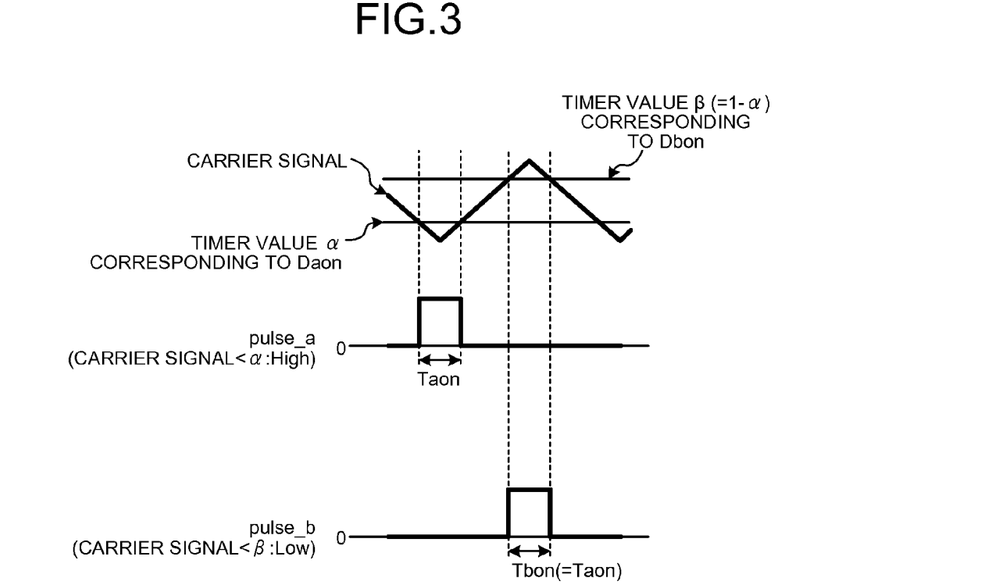
FIG. 3 is a diagram illustrating a relation between a carrier signal and a timer value of the power conversion device according to the first embodiment and respective waveforms of the drive pulses.

Then, an example of a method of generating the respective drive pulses (pulse_a, pulse_b) of the switching elements 5a and 5b so that the phase of the on-timing differs by a half cycle (180)° will be described. FIG. 3 is a diagram illustrating a relation between the carrier signal and the timer value of the power conversion device according to this embodiment, and respective waveforms of the drive pulses.

In the switching controller 10, the drive pulse generator 24 compares a carrier signal of a triangular wave to each of timer values α and β corresponding to the respective on-duties (Daon, Dbon) of the switching elements 5a and 5b, and generates each of the drive respective pulses (pulse_a, pulse_b) of the switching elements 5a and 5b, depending on the magnitude of the comparison result.

For example, as illustrated in FIG. 3, on the basis of the timer value α corresponding to the on-duty (Daon) of one switching element (here, the switching element 5a), the timer value β corresponding to the on-duty (Dbon) of the other switching element (here, the switching elements 5b) is set to a value (1−α) which is obtained by subtracting the value α corresponding to the on-duty (Daon) of the one switching element (here, the switching element 5a) from 1 (the magnitude of the carrier signal is set to "1"). The carrier signal of the triangular wave is compared to each of the timer value α corresponding to Daon and the timer value β(=1−α) corresponding to Dbon.

The drive pulse generator 24 generates the drive pulse (pulse_a) of the switching element 5a which becomes "High" when the timer value α corresponding to Daon is greater than the carrier signal, and becomes "Low" when the timer value α corresponding to Daon is smaller than the carrier signal. Further, the drive pulse generator 24 generates a drive pulse (pulse_b) of the switching element 5b which becomes "Low" when the timer value β(=1−α) corresponding to Dbon is greater than the carrier signal, and becomes "High" when the timer value $\beta(=1-\alpha)$ corresponding to Dbon is smaller than the carrier signal. By generating a drive pulse in such a way, the phase of the on-timing differs by 180°, and thus, the drive pulse (pulse_a) of the switching elements 5a and the drive pulse (pulse_b) of the switching element 5b having the same on-period (Taon=Tbon) is obtained.

The relations between the relative magnitudes of the carrier signal to the respective timer values $\alpha$ and $\beta$ when generating drive pulses (pulse_a, pulse_b), and "High" and "Low" of the drive pulses (pulse_a, pulse_b) are not limited to the above-described example, and relations between the respective on-duties (Daon, Dbon) and the respective on-periods (Taon, Tbon) of the drive pulses (pulse_a, pulse_b) may match.

Figure 4:
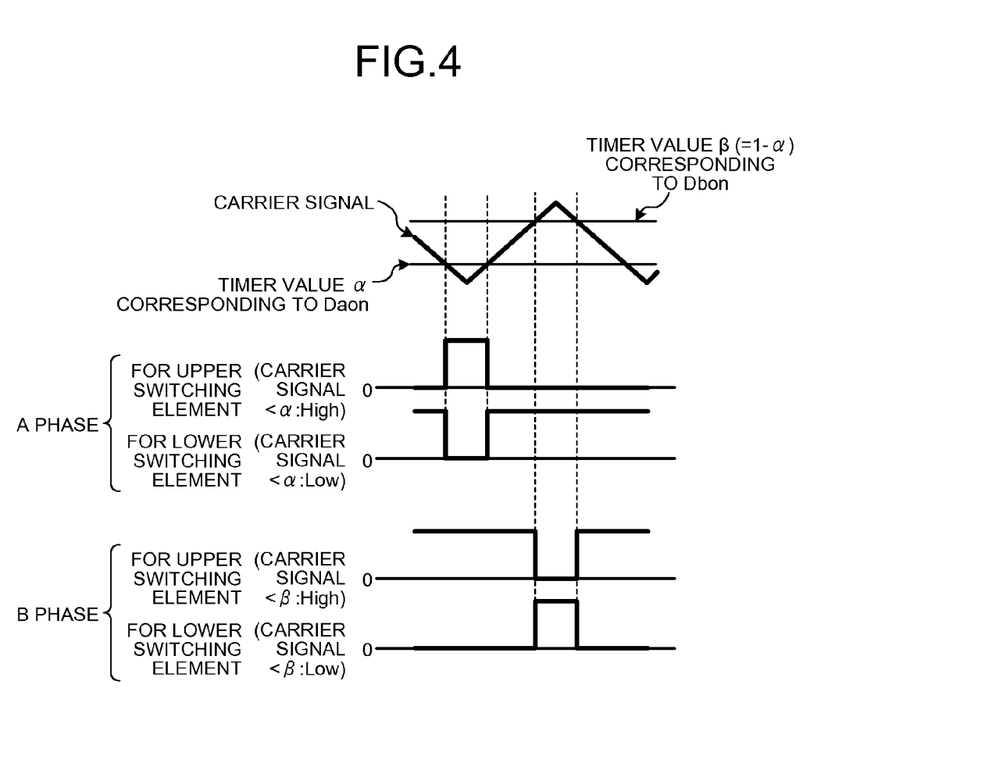
FIG. 4 is a diagram illustrating a relation between the carrier signal and the timer value and respective waveforms of the drive pulse when using a complementary PWM generation function of a three-phase inverter.

For example, a general-purpose microcomputer used for motor control may have a function of generating a complementary pulse width modulation (PWM) of the three-phase inverter. When generating the drive pulses of the upper and lower switching elements of each phase based on the timer values corresponding to the respective on-duties of the switching elements of the three-phase inverter, in the case of generating the two drive pulses in which the phase differs by a half period as described above, the generation function of the complementary PWM of the three-phase inverter may be used. FIG. 4 is a diagram illustrating a relation between the carrier signal and the timer value when using the complementary PWM generation function of the three-phase inverter, and each waveform of each drive pulse.

As illustrated in FIG. 4, when using the complementary PWM generation function of the three-phase inverter, if the timer values of any two phases of the three phases are set using the above-mentioned relation of $\alpha$ and $\beta(=1-\alpha)$, the upper (or lower) switching element drive pulse generated based on the timer value $\alpha$ corresponding to the upper (or lower) on-duty (Daon) of the switching element of an arm of one phase (A phase in the example illustrated in FIG. 4), and the lower (or upper) switching element drive pulse generated based on the timer value $\beta(=1-\alpha)$ corresponding to the lower (or upper) on-duty (Dbon) of the switching element of an arm of the other phase (B phase in the example illustrated in FIG. 4) are in a relation in which the phase differs by a half period. When the timer values are set on the software, using the function of generating the complementary PWM of the three-phase inverter, without changing the conditions of the magnitude of the carrier signal and each timer value on generating the drive pulse, and "High" and "Low" of each drive pulse, it is possible to easily generate the drive pulses of a relation in which the phases differ by a half cycle.

Here, even when the on-duties (Daon, Dbon) of the respective switching elements 5a and 5b are the same values in each of the chopper circuit units 3a and 3b, by errors of the rectified voltage (Vds) due to a phase difference of the on-timing of the switching elements 5a and 5b, variations in the inductance values La and Lb of the reactors 4a and 4b, or the like, the slopes ($\Delta$ILaon, $\Delta$ILbon) during on-timing and the slopes ($\Delta$ILaoff, $\Delta$ILboff) during off-timing of the respective switching elements 5a and 5b represented in the above-described formulas (2), (3), (5) and (6) become the different values, an imbalance occurs in the amount of change in the bus current (Idc) in each on-period of the switching elements 5a and 5b, a strain occurs in the bus current (Idc), and the harmonic component of the input current increases.

Therefore, in this embodiment, in the on-duty corrector 23, the reference on-duty (duty) calculated by the bus current command value controller 21 and the on-duty controller 22 using the bus current (Idc) and the bus voltage (Vo) is corrected to an on-duty suitable for the respective chopper circuit units 3a and 3b, depending on the errors of the rectified voltage (Vds) due to a phase difference of the on-timing of the respective switching elements 5a and 5b in the respective chopper circuit units 3a and 3b, and the variation in the inductance values La and Lb of the reactors 4a and 4b. Thus, it is possible to suppress an increase in harmonic components of the input current as described above.

Figure 5:
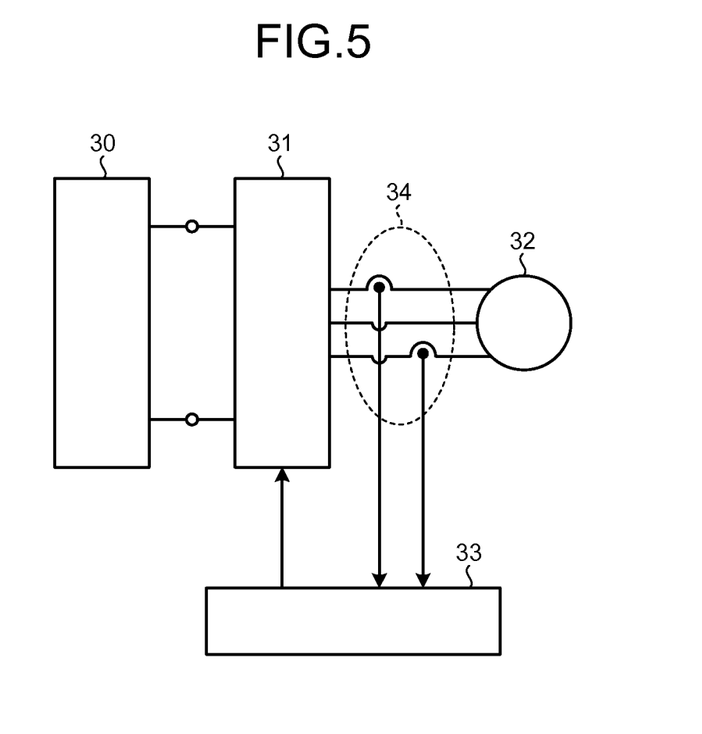
FIG. 5 is a diagram illustrating a configuration example of a motor drive control device equipped with the power conversion device according to the first embodiment.

Next, a motor drive control device equipped with the above-described power conversion device will be described. FIG. 5 is a diagram illustrating a configuration example of a motor drive control device equipped with the power conversion device according to this embodiment, and illustrates a state in which a load is connected to the power conversion device. In the example illustrated in FIG. 5, a power conversion device 30 is a power conversion device illustrated in FIG. 1. As the load of the power conversion device 30, a load to which an inverter 31 configured to convert a DC voltage into an AC voltage, and a motor 32 driven by application of the AC voltage as an output of the inverter 31 are connected is illustrated.

The inverter 31, for example, allows the switching element such as an IGBT to have a three-phase bridge configuration or a two-phase bridge configuration. The inverter controller 33 which controls the inverter 31, for example, calculates a voltage command so that the motor 32 rotates at a desired rotational speed, using a motor current detector 34 which detects a current flowing from the inverter 31 to the motor 32, thereby generating a pulse which drives the switching element in the inverter 31.

Furthermore, in the configuration illustrated in FIG. 5, similarly to the switching controller 10, the inverter control using the inverter controller 33, for example, may be achieved, using a calculation unit such as a microcomputer.

Also, in the power conversion device 30, the motor drive control device formed by the connection of a load illustrated in FIG. 5 has characteristics in which the required bus voltage (Vo) differs depending on the power load to the power conversion device 30.

In general, as the rotational speed of the motor 32 becomes high rotation, the output voltage from the inverter 31 needs to increase. However, the upper limit of the output voltage from the inverter 31 is limited by the input voltage to the inverter 31, that is, the bus voltage (Vo) which is the output of the power conversion device 30. A region in which the output voltage from the inverter 31 is saturated beyond the upper limit limited by the bus voltage (Vo) is called an over-modulation region.

In such a motor drive control device, in a range in which the motor 32 rotates at low speed (does not reach the over-modulation region), it is not necessary to raise the bus voltage (Vo), and when the motor 32 rotates at high speed, the over-modulation region can be set to a higher rotation side by raising the bus voltage (Vo). Thus, it is possible to expand the operating range of the motor 32 to the high-rotation side.

Also, if there is no need to expand the operating range of the motor 32, it is possible to increase the number of windings of a stator winding of the motor 32 accordingly. At this time, in the region of low rotational speed, as the motor voltage increases, the current decreases, and thus, a loss reduction in the inverter 31 is expected. To obtain both the effects of the operating range expansion of the motor 32 and the loss improvement in the low rotational speed range, an extent of increasing the number of windings of the motor 32 may be suitably designed.

Figure 6:
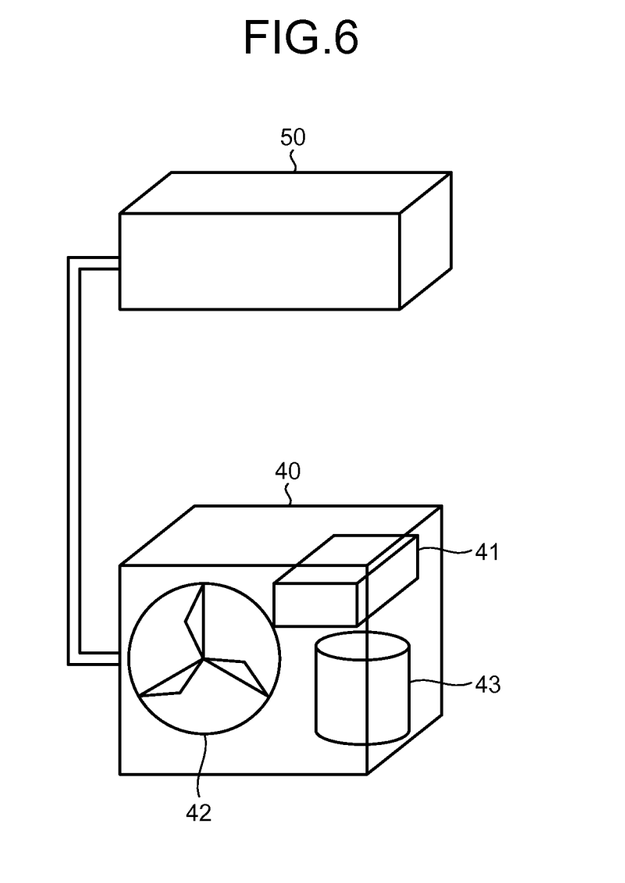
FIG. 6 is a diagram illustrating a configuration example of an air conditioner equipped with the motor drive control device.

Further, it is possible to obtain the same effect even when configuring an air conditioner by using the motor drive control device applied with the power conversion device 30 to drive a motor of at least one of a blower and a compressor. FIG. 6 is a diagram illustrating a configuration example of an air conditioner equipped with a motor drive control device. The outdoor unit 40 is equipped with a motor drive control device 41, a blower 42, and a compressor 43 illustrated in FIG. 6, and constitutes an air conditioner together with the indoor unit 50. The motor drive control device 41 performs the motor drive control on at least one of a motor used in the blower 42 or a motor used in the compressor 43. In FIG. 6, although the wirings or the like are not illustrated to show a conceptual overview, the motor drive control device 41 is connected to the blower 42 and the compressor 43 by wirings or the like.

Next, the operation for high efficiency in the slow operating condition of the driving motor when applying the power conversion device to the motor drive control device will be described. In FIG. 1, the AC switch 12 is set as an a-contact type electromagnetic switch which is turned on in the excited state, and the AC reactor 13 is set as a low-frequency AC reactor of a commercial power supply band using a steel plate core. Also, here, the description will be given of a case where a load of the power conversion device is set as a compressor for a variable-speed type air conditioner using an inverter, and the compressor is applied to the air conditioner.

When the air conditioning load is small and the output is a predetermined output or less, specifically, in the output ⅟10 or less of the maximum output corresponding to an intermediate operating condition of the air conditioning in which an annual operating rate of a compressor using an inverter is high, in the power conversion device, the power supply current passes through the AC reactor 13 in a state in which the AC switch 12 opens the contact which does not allow the exciting current to flow. The AC reactor 13 is not magnetically saturated under the intermediate operating condition, and is set to 1 to 15 mH capable of suppressing the power supply harmonic current under the passive condition in which the switching elements 5a and 5b are not switched. Thus, in the power conversion device, a steady loss and a switching loss of the switching elements 5a and 5b, a recovery loss of the backflow prevention elements 6a and 6b, and the high-frequency iron loss of the reactors 4a and 4b caused by the switching of the switching elements 5a and 5b are eliminated, and the converter loss can be reduced. In particular, since it is possible to reduce a loss under the condition of the high annual operating rate, it greatly contributes to energy saving of the overall air conditioner. In addition, by using the AC switch 12 as an a-contact type electromagnetic switch, the loss caused by the excitation of the AC switch 12 (the electromagnetic switch) under the intermediate operating conditions can also be eliminated.

Meanwhile, when the air conditioning load is large and the compressor with the inverter is under a high-output condition, specifically, in the output larger than ⅟10 of the maximum output, in the power conversion device, the contact of the AC switch 12 is closed, the AC reactor 13 is bypassed, and the current control is performed by the switching of the switching elements 5a and 5b to suppress the power supply harmonic current. By bypassing the AC reactor 13, instability of the current control caused by the saturation of the AC reactor 13 due to the high current during high output is avoided. Further, by adopting such a construction, since the AC reactor 13 may be an AC reactor having the low frequency of the intermediate operating condition and the low-current rating, it is possible to suppress the cost. Also, as the AC switch 12, in general, it is possible to use an AC switch of a cost lower than a DC switch. By using such AC reactor 13 and AC switch 12, an improvement in efficiency of the intermediate operating conditions of an air conditioner equipped with a high-frequency switching converter can be achieved at a minimum cost.

In addition, in the power conversion device, the switching controller 10 may perform a control of opening the contact of the AC switch 12 when stopping the switching of the switching elements 5a and 5b, without being limited to a control of stopping the switching of the switching elements 5a and 5b when the contact of the AC switch 12 is open.

Further, in the power conversion device, when the contact welding of the AC switch 12 (electromagnetic switch) occurs in an aged failure mode, the contact welding is detected, and it is possible to suppress the harmonic current by the current control through the switching of the switching elements 5a and 5b even under the intermediate operating condition. Thus, although the efficiency decreases, the function of the air conditioner is maintained, and it is possible to obtain a power conversion device and an air conditioner having a long lifetime.

In the detection method of the contact welding, the bus current detector 8 detects the presence or absence of the power supply harmonic current during the switching stop of the switching elements 5a and 5b, and performs determination. When the AC switch 12, the switching elements 5a and 5b and the air conditioner inverter are controlled by a single microcomputer, the main continuous operation function can be achieved only by S/W, and an additional cost is not required. Furthermore, by performing the control using a single microcomputer, it is also possible to adjust the current and the control gain of the motor in an open state and a closed state of the contact, only by a change in S/W, and thus, it is possible to continuously operate the motor when switching the contact. Thus, it is possible to obtain an air conditioner which is able to reduce the loss of the refrigerant circuit due to the operation and the stop when switching the contact conditions and to reduce discomfort due to temperature changes.

Furthermore, in the power conversion device, since the reactive current under the intermediate operating conditions is suppressed by suppressing the harmonic current by the AC reactor 13, it is also possible to reduce a steady loss of the backflow prevention elements 6a and 6b, and a copper loss of the reactors 4a and 4b.

As described above, according to this embodiment, in the power conversion device, when the AC switch and the AC reactor connected in parallel to the AC switch are equipped between the AC power supply and the rectifier, and they are connected to the inverter which drives a motor as a load, thereby forming a motor drive control circuit, the switching of the AC switch is controlled depending on the driving state of the motor. Thus, it is possible to suppress the harmonic current from the AC power supply by a simple configuration, regardless of the operating modes of the connected load, and it is also possible to reduce the loss for each element during a low-speed operation when the motor is connected.

Further, in the power conversion device, although the case of disposing the switch and the reactor in an AC section between the AC power supply and the rectifier has been described, the arrangements of the switch and the reactor are not limited thereto. The switch and the reactor may be located on the AC power supply side further than the chopper circuit unit. Therefore, in the power conversion device, a configuration in which the switch and the reactor, for example, are provided in a DC section between the rectifier and the chopper circuit unit. In this case, the switch and the reactor for DC is used rather than those for AC.

Second Embodiment

Figure 7:
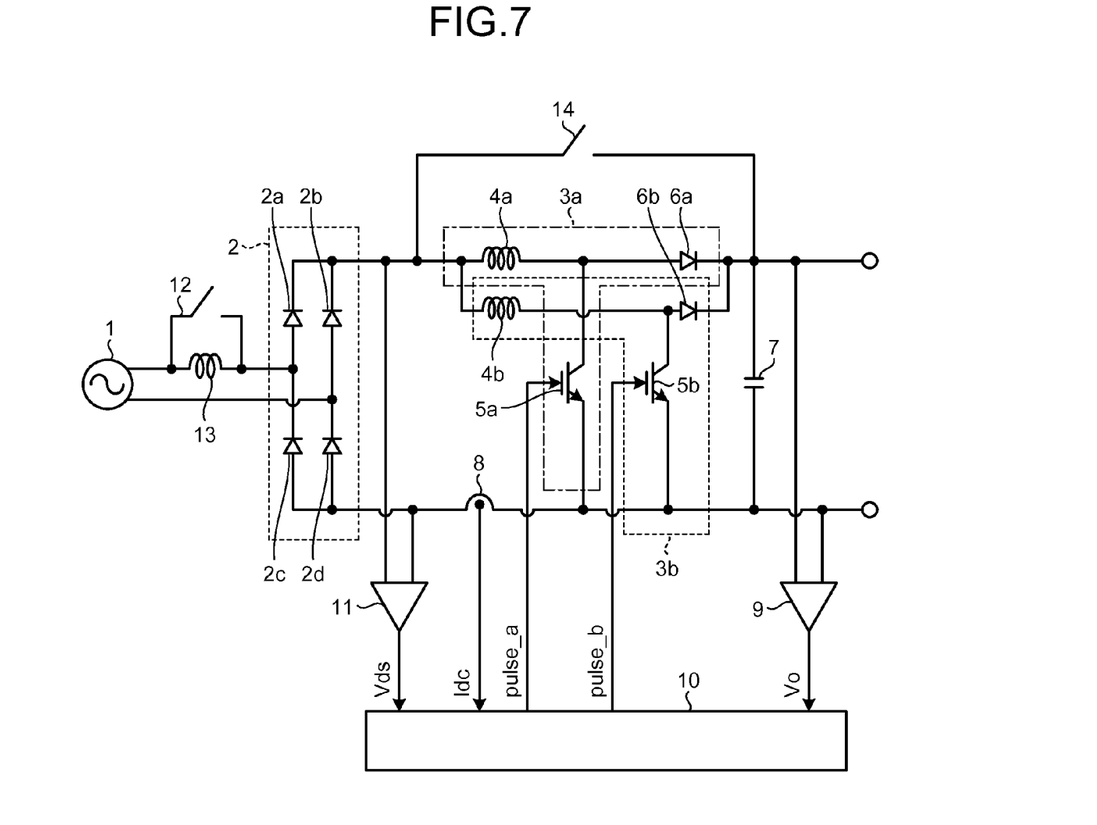
FIG. 7 is a diagram illustrating a configuration example of a power conversion device according to a second embodiment.

FIG. 7 is a diagram illustrating a configuration example of a power conversion device according to this embodiment. This is a configuration in which a DC switch 14 is added to the configuration of the first embodiment (see FIG. 1). The DC switch 14 is disposed in parallel to the chopper circuit units 3a and 3b.

The DC switch 14 is a b-contact type electromagnetic switch in which a contact is in an open state in the case of being excited. The DC switch 14 closes the contact under an intermediate operating condition, and performs the excitation during the current control of the switching operation of the switching elements 5a and 5b under an output condition higher than the intermediate operating condition, and sets the contact to the open state. Other configurations and operations are the same as those of the first embodiment.

Thus, in the power conversion device, it is possible to reduce the steady loss of the backflow prevention elements 6a and 6b and the copper loss of the reactors 4a and 4b under the intermediate operating condition through bypassing, and the losses can be further reduced as compared to the case of the first embodiment. Moreover, although the DC switch 14 is a DC relay, since the closing operation of the contact is performed only under the intermediate operating condition with a small current and under a condition in which the harmonic current is suppressed by the AC reactor 13, a current capacity may be small, and it is possible to reduce a loss under the intermediate operating condition at low cost. Also, it is possible to eliminate a loss due to the occurrence of the exciting current of the AC switch 12 and the DC switch 14 under the intermediate operating condition by such configuration and operation.

Further, similarly to the first embodiment, the power conversion device of this embodiment can be applied to a motor drive control device and can be used to drive a blower or a compressor equipped with the motor drive control device, and at least one of the motor of the blower or the motor of the compressor to form an air conditioner.

Also, in the power conversion device, in the case of a configuration in which the switch and the reactor are provided in a series section between the rectifier and the chopper circuit unit, the switch and the reactor are disposed so as not to be parallel to the DC switch 14. That is, the contact of the AC power supply 1 side of the DC switch 14 is located between the switch, the reactor and the chopper circuit unit.

Third Embodiment

Figure 8:
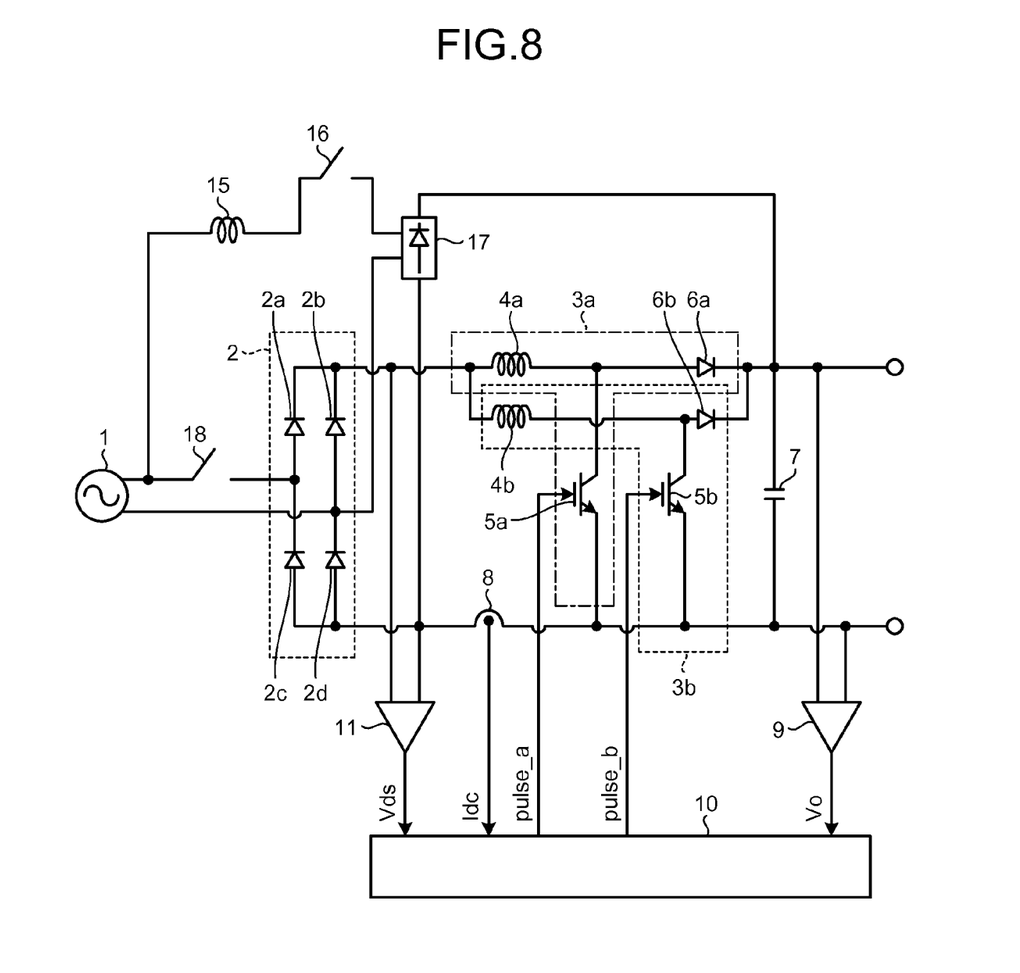
FIG. 8 is a diagram illustrating a configuration example of a power conversion device according to a third embodiment.

FIG. 8 is a diagram illustrating a configuration example of a power conversion device according to this embodiment. This configuration is obtained by removing the AC switch 12 and the AC reactor 13 from the configuration of the first embodiment (see FIG. 1), and by adding an AC reactor 15, an AC switch 16, a rectifier 17 and an AC switch 18. The AC reactor 15, the AC switch 16 and the rectifier 17 are connected in series to one another, and are disposed to be parallel to the rectifier 2 and the chopper circuit units 3a, and 3b as the first rectifiers. The rectifier 17 as a second rectifier has the same configuration as the rectifier 2 which is a first rectifier. Also, the AC switch 18 is disposed between the AC power supply 1 and the rectifier 2.

The AC switch 16 as a first AC switch is a b-contact type electromagnetic switch in which the contact is open in the case of being excited. Moreover, the AC switch 18 as a second AC switch is an a-contact type electromagnetic switch in which the contact is closed in the case of being excited. In this embodiment, under the intermediate operating condition, the AC switch 16 closes the contact, and the AC switch 18 opens the contact. Also, under an output condition higher than the intermediate operating condition, the AC switch 16 opens the contact and the AC switch 18 closes the contact, thereby performing a current control through the switching operation of the switching elements 5a and 5b. Other configurations and operations are the same as those of the first embodiment.

Thus, in the power conversion device, the steady loss of the backflow prevention elements 6a and 6b and the copper loss of the reactors 4a and 4b under the intermediate operating condition can be reduced through bypassing, and the loss can be further reduced, as compared to the case of the first embodiment. Moreover, since the AC switches 16 and 18 can be formed by an AC relay, it is possible to reduce a loss under the intermediate operating condition at low cost. Also, by the configuration and operation as described above, it is also possible to eliminate the loss due to the occurrence of the exciting current of the AC switches 16 and 18 under the intermediate operating condition.

Further, similarly to the first embodiment, the power conversion device of this embodiment can be applied to a motor drive control device and can be used to drive a blower or a compressor equipped with the motor drive control device, and at least one of the motor of the blower or the motor of the compressor to form an air conditioner.

Also, in the power conversion device, similarly to the AC switch 12 of the first embodiment, the arrangement of the AC switch 18 is not limited to the AC section between the AC power supply 1 and the rectifier 2. The power conversion device may have a configuration in which a DC switch having the same applications as the AC switch 18 is provided in the DC section between the rectifier and the chopper circuit unit.

Also, in the power conversion device, similarly to the control of the AC switch 12 of the first embodiment, the switching controller 10 may perform a control of opening the contact of the AC switch 18 when stopping the switching of the switching elements 5a and 5b, without being limited to a control of stopping the switching of the switching elements 5a and 5b when the contact of the AC switch 18 is open.

Fourth Embodiment

In the first to third embodiments, as illustrated in FIGS. 1 to 8, the electromagnetic switch is used for each switch, but it is not limited thereto. For example, a metal-oxide-semiconductor field effect transistor (MOS-FET) using a wide band gap semiconductor such as an insulated gate type bipolar transistor (IGBT) using a silicon (Si) semiconductor, thyristor, a solid-state relay, silicon carbide (SiC) and gallium nitride (GaN) may be used as a switch.

In this case, it is possible to obtain an air conditioner which can be switched at a higher speed than the electromagnetic switch, can reduce the fluctuation in the operation conditions during the switching as compared to the electromagnetic switch and can reduce discomfort due to the loss reduction and the temperature change of the refrigerant circuit. Also, when using a wide band gap semiconductor such as SiC, the higher effect can be obtained by low loss. Further, since the voltage resistance is high and the allowable current density is also high, it is possible to reduce the size of each switch, and it is also possible to reduce the size of the power conversion device equipped with each switch.

Fifth Embodiment In the first to fourth embodiments, the description has been given of the case of using the compressor of the air conditioner as a specific example of the load of the power conversion device, but it is not limited to thereto. It goes without saying that the same effect can also be obtained, for example, even when using a water heater, a refrigerant compressor of a heating hot-water generator.

INDUSTRIAL APPLICABILITY

As described above, the power conversion device according to the present invention is useful for the power conversion and is particularly suitable for the case of driving the motor.

The invention claimed is:

1. A power conversion device for an AC power supply comprising:
   a rectifier that rectifies an AC voltage from the AC power supply;
   at least two chopper circuit units provided in parallel to each other, each of which chops the output of the rectifier, each including a DC reactor, a switching element and a backflow prevention element;
   a switch disposed on a side closer to the AC power supply than the at least two chopper circuit units;
   a reactor that is connected in parallel to the switch; and
   a control unit that stops the switching of the switching element of each of the at least two chopper circuit units when the contact of the switch is open, wherein:
   in each of the at least two chopper circuit units, one end of the switching element is connected to a connection point between the DC reactor and the backflow prevention element, and
   the control unit includes an on-duty corrector to correct a reference on-duty of the switching element of each of the at least two chopper circuit units.

2. The power conversion device according to claim 1, further comprising:
   a DC switch disposed in parallel to each of the at least two chopper circuit units, wherein
   the control unit controls the operation of the switching element, the switch and the DC switch.

3. The power conversion device according to claim 1, wherein
   the switch is formed of a Si semiconductor or a wide band gap semiconductor.

4. A motor drive control device comprising:
   the power conversion device according to claim 1; and
   an inverter that drives a motor by converting a DC voltage as the output of the power conversion device into an AC voltage.

5. A compressor comprising:
   the motor drive control device according to claim 4; and
   a motor driven by the motor drive control device.

6. A blower comprising:
   the motor drive control device according to claim 4; and
   a motor driven by the motor drive control device.

7. An air conditioner comprising the compressor according to claim 5.

8. A power conversion device for an AC power supply comprising:
   a rectifier that rectifies an AC voltage from the AC power supply;
   at least two chopper circuit units provided in parallel to each other, each of which chops the output of the rectifier, each including a DC reactor, a switching element and a backflow prevention element;
   a switch disposed on a side closer to the AC power supply than each of the at least two chopper circuit units;
   a reactor connected in parallel to the switch; and
   a control unit that opens the contact of the switch when stopping the switching of the switching element of each of the at least two chopper circuit units, wherein
   in each of the at least two chopper circuit units, one end of the switching element is connected to a connection point between the DC reactor and the backflow prevention element and
   the control unit includes an on-duty corrector to correct a reference on-duty of the switching element of each of the at least two chopper circuit units.

9. The power conversion device according to claim 8, further comprising:
   a DC switch disposed in parallel to each of the at least two chopper circuit units, wherein
   the control unit controls the operation of the switching element, the switch and the DC switch.

10. The power conversion device according to claim 8, wherein
    the switch is formed of a Si semiconductor or a wide band gap semiconductor.

11. A motor drive control device comprising:
    the power conversion device according to claim 8; and
    an inverter that drives a motor by converting a DC voltage as the output of the power conversion device into an AC voltage.

12. A compressor comprising:
    the motor drive control device according to claim 11; and
    a motor driven by the motor drive control device.

13. A blower comprising:
    the motor drive control device according to claim 11; and
    a motor driven by the motor drive control device.

14. A power conversion device for an AC power supply comprising:
    a first rectifier that rectifies an AC voltage from the AC power supply;
    at least two chopper circuit units provided in parallel to each other, each of which chops the output of the first rectifier, each including a DC reactor, a switching element and a backflow prevention element;
    a reactor, a first switch and a second rectifier disposed in parallel to the first rectifier and to each of the at least two chopper circuit units, and connected in series with one another;
    a second switch disposed on a side closer to the AC power supply than the at least two chopper circuit units; and
    a control unit that controls the operation of the switching element of each of the at least two chopper circuit units, the first switch and the second switch, wherein
    in each of the at least two chopper circuit units, one end of the switching element is connected to a connection point between the DC reactor and the backflow prevention element, and
    the control unit includes an on-duty corrector to correct a reference on-duty of each of the switching elements of each of the at least two chopper circuit units.

15. The power conversion device according to claim 14, wherein
    the control unit opens the contact of the second switch, when stopping the switching of the switching element.

16. The power conversion device according to claim 14, wherein
   the first switch and the second switch are formed of a Si semiconductor or a wide band gap semiconductor.

17. A motor drive control device comprising:
   the power conversion device according to claim 14; and
   an inverter that drives a motor by converting a DC voltage as the output of the power conversion device into an AC voltage.

18. A compressor comprising:
   the motor drive control device according to claim 17; and
   a motor driven by the motor drive control device.

19. A blower comprising:
   the motor drive control device according to claim 17; and
   a motor driven by the motor drive control device.

* * * * *